United States Patent

Ansari

[11] Patent Number: 5,109,760
[45] Date of Patent: May 5, 1992

[54] CHEESE DISTRIBUTOR

[75] Inventor: Khalid S. Ansari, Ann Arbor, Mich.

[73] Assignee: Domino's Pizza, Inc., Ann Arbor, Mich.

[21] Appl. No.: 466,065

[22] Filed: Jan. 16, 1990

[51] Int. Cl.⁵ .................. A21C 9/04; B05C 5/00; A23C 19/00
[52] U.S. Cl. ..................... 99/494; 99/450.1; 99/452; 118/24; 118/31; 209/236
[58] Field of Search .............. 99/452, 456–459, 99/494, 450.1; 118/16, 13, 18, 24, 31; 209/236, 338, 357

[56] References Cited

U.S. PATENT DOCUMENTS

| | | | |
|---|---|---|---|
| 2,163,766 | 6/1939 | Spencer | 209/357 |
| 3,415,376 | 12/1968 | Smith et al. | 209/357 |
| 3,648,596 | 3/1972 | Zito | 118/31 |
| 3,648,649 | 3/1972 | Wasserman | 118/31 |
| 4,131,080 | 12/1978 | Hughes | 118/13 |
| 4,197,794 | 4/1980 | Raque et al. | 99/494 |
| 4,245,581 | 1/1981 | Spencer | 118/24 |
| 4,271,011 | 6/1981 | Spencer et al. | 209/236 |
| 4,497,244 | 2/1985 | Koppens | 99/450.1 |
| 4,738,774 | 4/1988 | Patrick | 209/236 |
| 4,750,997 | 6/1988 | Hoppe | 209/236 |

Primary Examiner—Timothy F. Simone
Attorney, Agent, or Firm—Beaman & Beaman

[57] ABSTRACT

The invention pertains to apparatus for evenly distributing food particles over a base food, and in particular is directed to apparatus for evenly distributing a predetermined quantity of cheese particles upon a pizza. The apparatus includes a conical screen supported above the pizza upon which cheese is to be distributed and comminuted cheese particles located within a hopper above the screen are dropped in a mass upon the screen and distributed by gravitational force in an even pattern over the pizza.

11 Claims, 1 Drawing Sheet

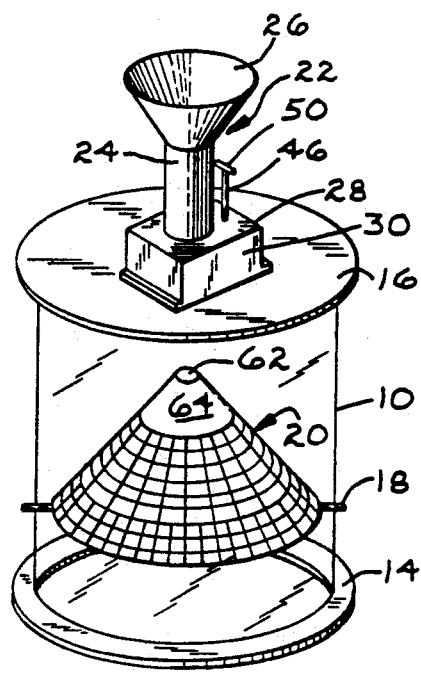

CHEESE DISTRIBUTOR

BACKGROUND OF THE INVENTION

In the manufacture of foods it is common to distribute food particles upon a base food. For instance, in pie making the ingredients of the pie are evenly distributed over the crust, and such even distribution of food particles is highly desirable in the making of pizza. Commonly, pizza is formed by distributing cheese particles, and other food particles, evenly over a crust prior to baking.

The popularity of pizza, and the high volume production thereof, necessitates both for quality and economical reasons that the pizza ingredients be evenly distributed over the pizza surface. Such even distribution of a predetermined portion of food particles, particularly cheese, are important to give the pizza an attractive consistent appearance, uniform baking characteristics, and uniform cutting and taste characteristics. Heretofore, a food particle distributor of such a size as to be practical for use in retail stores in the making of pizza has not been available.

In the baking arts various types of food distributors or sifters have been devised, such as shown in U.S. Pat. Nos. 3,186,358, 3,415,376 and 3,648,649. However, such prior art devices are not suitable for distributing cheese upon pizza, and the distribution of food ingredients upon pizza in retail stores continues to be done by hand wherein the distribution of the food particles is entirely dependent upon the skill of the pizza maker.

It is an object of the invention to provide a food particle distributor of economical construction and such ease of use and dependability of operation as to be practical in the high production making of pizza.

Another object of the invention is to provide a cheese distributor for use in making pizza wherein minimal operator skills are required, and a uniform distribution of cheese over the surface of the pizza is attained.

Yet another object of the invention is to provide a cheese distributor for pizza wherein a predetermined amount of cheese may be readily confined within a hopper and released as a mass over a screen distributor wherein the only forces necessary to produce the food distribution are gravitational.

A further object of the invention is to provide a cheese distributor for use in making pizza wherein the distributor may be easily cleaned and will meet food sanitation requirements.

In the practice of the invention a cylindrical frame is located over the pizza upon which cheese is to be distributed. The frame includes a screen located in a spaced relationship above the pizza, and the screen is of a conical configuration converging in an upward direction.

A hopper is mounted upon the frame at its upper region and includes a cylindrical tube closed at its lower end by a spring biased trap door arrangement wherein particles of cheese may be located within the hopper and constrained therein by the trap door. Upon release of the trap door the cheese located within the hopper is released as a mass and maintains the configuration as confined within the hopper as it falls toward the screen. Upon the cheese mass striking the screen the particles are quickly distributed by gravitational forces over and through the screen and the particles are evenly distributed over the lower frame area and upon a pizza located below the lower region of the frame.

The screen includes a hole defined in the apex of the screen conical configuration of a diameter less than the diameter of the hopper, and also, a solid baffle impervious to movement of food particles therethrough is located upon the screen adjacent the opening. The opening and the baffle aid in the even distribution of the food particles under gravitational forces, and the combination of the release of the cheese particles in a mass, the configuration and shape of the screen including the opening, baffle and size of the screen openings all permit the cheese particles to be distributed in an even manner over the area located below the screen, and over the surface of a pizza located below the screen and frame.

BRIEF DESCRIPTION OF THE DRAWINGS

The aforementioned objects and advantages of the invention will be appreciated from the following description and accompanying drawings wherein:

FIG. 1 is a perspective view of a cheese distributor in accord with the invention, FIG. 2 is an elevational view, partially sectioned, illustrating the cheese distributor of the invention, the trap door being shown in solid lines in the open or release position, FIG. 3 is a elevational view of the distributor screen, per se, FIG. 4 is a plan view of the screen, per se, FIG. 5 is a detailed, enlarged, sectional view of the lower end of the hopper showing the trap door in the closed condition in full lines and in the open position in dotted lines, FIG. 6 is a side elevational view, enlarged, illustrating the operating mechanism for the trap door, and FIG. 7 is an elevational view of a two door panel trap door embodiment, illustrating the door panels in the closed condition in full lines and in the open condition in dotted lines.

DESCRIPTION OF THE PREFERRED EMBODIMENT

The basic components of a cheese distributor in accord with the inventive concepts will be appreciated from FIGS. 1 and 2. The frame 10 is preferably of a cylindrical configuration having an inner diameter only slightly smaller than the largest circular pizza 12 over which the cheese is to be distributed. At its lower edge the distributor includes an outwardly extending foot flange 14 which is used to support the frame on supports 15 and at its upper region the frame includes a removable cover 16.

A plurality of radially inwardly extending ledge pins 18 are mounted in the wall of the frame vertically spaced above the frame lower flange 14, and the ledge pins constitute the support for the screen generally indicated at 20. Preferably, the frame 10 is formed of a transparent material, such as plexiglass or the like, which is easily cleaned and yet permits visual inspection of the inside of the frame and screen.

A hopper 22 is mounted upon the cover 16, and in the simplified form illustrated the hopper includes a cylindrical portion 24, and an upper funnel portion 26 wherein small cheese particles may be readily deposited in the portion 24. The hopper 22 is supported upon a deck 28 mounted on the cover 16 and the deck includes vertical sides 30.

In FIGS. 1, 2, 5 and 6 a single panel trap door 32 located within deck 28 is shown for closing the hopper lower end 34. The trap door 32 is of sufficient dimension to completely close the hopper lower end 34 when pivoted to its confining position shown in FIG. 5. The trap door is mounted upon a pivot shaft 36 rotatably extending through the deck sides 30, and the weight of the door 32 is counterbalanced by extension 38 having weight 40 affixed thereto. Externally of the confines of the deck 28 a gear 42 is mounted upon the pivot shaft 36 and meshes with the teeth 44 formed on the vertically disposed actuator 46 reciprocally mounted within guides 48 supported on the deck 28. The upper end of the actuator includes a handle 50, and the weight 40 biases the pivot shaft in a counterclockwise direction, FIG. 5, biasing the trap door 32 into engagement with the lower end 34 of the hopper as shown in FIG. 5.

A downward force applied to the handle 50 causes a downward translation of the actuator 46 rotating the pivot shaft 36 in the clockwise direction, FIG. 5, pivoting the trap door 32 to the full line open position shown in FIG. 2 to release the cheese from the hopper 22.

The distributor screen 20 is concentrically located within the frame 10 with respect to the axis of the hopper portion 24, and the screen is of a truncated conical configuration having a lower circular periphery 54 resting upon the ledge pins 18. The screen is usually formed by a plurality of linear wires or elements 56 extending toward the apex of the screen, and a plurality of circular wires 58 welded to the wires 56 at spaced vertical intervals define substantially trapezoidal screen openings 60. It is also to be appreciated that the screen 20 could be molded or fabricated of a synthetic plastic material.

The screen apex is defined by a circular opening 62 concentric with the screen axis and the hopper portion 24. The opening 62 is of a diameter less than the diameter of the hopper portion 24, and as later described the cheese mass initially engages the periphery of the opening 62 as it falls toward the screen 20.

A truncated conical sheet metal baffle 64, preferably formed of stainless steel, is located at the upper region of the screen 20 adjacent the opening 62. The baffle 64 is, of course, impervious to the passing of food particles therethrough, and is of sufficient vertical dimension to only extend along the length of the screen no greater than one-third of the length of the screen from its periphery 54 to the opening 62.

As will be readily appreciated from FIGS. 3 and 4, auxillary wires 68 may be located in the screen to reduce the dimension of the screen openings 60 adjacent the periphery 54, and the dimension of the opening 62, the vertical height of the baffle 64, and the dimension of the screen openings 60, may be slightly varied in accord with the type of cheese particles being distributed with respect to size and consistency. A smaller and denser cheese particle will require a different diameter opening 62, baffle dimension and screen opening size than a softer, larger cheese particle, and the optimum dimension of these screen components is primarily determined by trial and error.

In operation, the screen 20 is mounted upon the ledge pins 18 in the manner apparent from FIG. 2. The frame 10 is placed upon the support 15 and the pizza 12 upon which cheese is to be distributed will be located upon the perforated surface 79 of a catch pan, not shown, located in the pizza "make" line. The weight 40 will have biased the trap door 32 into the closed or constraining position against hopper end 34 a shown in FIG. 5. Cheese particles are now dropped into the hopper portion 24 through the funnel portion 26 and a premeasured amount of cheese is located within the hopper. Of course, the cheese within the hopper will form a mass 70 as determined by the cross-sectional configuration of the hopper portion 24, and the flat configuration of the trap door 32. It will be understood that the counter weight force biasing the trap door 32 in the counterclockwise direction, FIG. 5, is sufficient to overcome the weight of the cheese imposed upon the trap door.

Once the hopper is properly loaded with the desired amount of cheese particles the operator quickly thrusts the actuator 46 downwardly overcoming the force of the counter weight 40 rapidly removing the trap door from the bottom of the hopper to the fully open position shown in full lines in FIG. 2 and dotted lines in FIG. 5. This rapid pivoting of the trap door 32 permits the cheese particles within the hopper portion to fall as a mass 70, FIG. 2, toward the screen 20 unimpeded by the trap door 32 which clears the path of cheese movement. At this time the cross-sectional configuration of the cheese mass 70 will be as determined by the cross-sectional configuration of the hopper portion 24.

Upon the cheese mass 70 engaging the upper apex of the screen adjacent the opening 62 a portion of the cheese particles will fall through the opening 62 and a larger portion will strike the baffle 64 and be evenly distributed over the lower regions of the screen defined by the openings 60. The cheese particles will fall through the screen openings 60, and by gravity be deposited upon the pizza 12 located on the catch pan screen 79 below the frame 10.

The dimension of the screen periphery 54 is about one inch diameter less than the inner diameter of the frame 10 producing a slight annular gap 77, and all of the cheese particles deposited upon the pizza will either have fallen through the opening 62, the screen openings 60 or the gap 77.

It has been discovered that by relating the diameter of the opening 62 to the diameter of the cheese mass 70 that the cheese particles that fall through the opening 62 distribute themselves substantially evenly over the central portion of the pizza 12. For instance, in one embodiment, the diameter of the mass 70 is 2.75" while the diameter of opening 62 is $\frac{5}{8}$". This central distribution of the cheese particles is believed to be due to the agitation of the cheese particles as they fall through the opening, and as the opening 62 is of a lesser diameter than that of the mass 70 the mass will quickly disintegrate in the region of the opening and the majority of the cheese particles of the mass will fall upon the baffle 64 and the screen wires and not pass through the opening 62.

After the cheese has been distributed upon the pizza 12 the pizza 12 is removed from under the frame 10 and additional toppings may be applied to the pizza, such as pepperoni or meat, if they have not already been applied, and the pizza is then baked.

Of course, shortly after the actuator 46 is depressed by the operator the handle 50 is released permitting the trap door 32 to swing to the closed position shown in FIG. 2, and the hopper 22 may be readily recharged with new cheese particles for distribution over the next pizza to be made.

The disclosed apparatus may be easily cleaned by removing the cover 16 from the frame 10, and the screen 20 is also removed from the frame, and the cover, frame and screen may be placed within washing apparatus and quickly sanitized. Of course, the metal components of the apparatus are preferably of stainless steel and many of the components are formed of synthetic plastic so as to be cleaned without corrosion occurring.

FIG. 7 illustrates another embodiment of trap door which may be used with the hopper 22 of the invention. In this embodiment the trap door consists of two door panels 72 and 74, panel 72 being pivotally mounted upon pivot 76, and panel 74 being pivotally mounted upon pivot 78. The pivots 76 and 78 are supported upon the sides of the cover deck, now shown, and a linkage 80 consisting of arms 82 pivotally connected to doors 72 and 74 by pivots 84, and interconnected by pivot 86 ensures simultaneous operation of the door panels. The actuator shaft 88 is preferably mounted upon the link pivot 86 wherein downward movement of the actuator shaft will pivot the door panels 72 and 74 to the open position shown in dotted lines in FIG. 7. Tension coil springs 90 affixed to the deck and the door panels upwardly biases the door panels to the hopper closed or containment position shown in full lines.

As the diameter of the frame 10 is slightly less than the diameter of the largest pizza 12 to be processed one size of frame will suffice for all sizes of pizza over which cheese is to be distributed. Pizzas smaller than the frame 10 are merely placed below the frame and cheese will be uniformly distributed thereover as described above as the cheese is uniformly distributed over the entire diameter of the frame. The excess cheese not falling on the smaller pizza is received within a catch pan located below surface 79 and is reused.

It will be appreciated from the above description that the food particle distributor of the invention can be operated with minimum skills, is readily cleaned, assembled and disassembled, and permits food particles such as cheese to be evenly distributed in predetermined amounts over pizza, or the like.

It is appreciated that various modifications to the inventive concept may be apparent to those skilled in the art without departing from the spirit and scope of the invention.

I claim:

1. Apparatus for evenly distributing predetermined portions of food particles over a surface comprising, in combination, a frame adapted to be superimposed over the surface to receive the food particles, a screen mounted on said frame having an axis and a plurality of openings defined therein through which the food particles may fall, a hopper mounted on said frame in spaced relationship above said screen having a food particle confinement portion substantially aligned with said screen axis, and instantaneous food particle release means in alignment with said screen axis instantaneously movable between release and confine positions maintaining the food particles within said hopper confinement portion when in said confine position and permitting the food particles to fall from said confinement portion in a mass having a configuration substantially corresponding to the cross section of said confinement portion transverse to said screen axis when moved to said release position, the food particles defining said mass separating and being substantially evenly distributed below said screen over the surface upon said mass engaging said screen and the food particles falling therethrough, said screen being of a conical configuration converging in the direction of said food particle release means.

2. Apparatus for evenly distributing predetermined portions of food particles over a surface comprising, in combination, a frame adapted to be superimposed over the surface to receive the food particles, a screen mounted on said frame having an axis and a plurality of openings defined therein through which the food particles may fall, a hopper mounted on said frame in spaced relationship above said screen having a food particle confinement portion substantially aligned with said screen axis, and instantaneous food particle release means in alignment with said screen axis instantaneously movable between release and confine positions maintaining the food particles within said hopper confinement portion when in said confine position and permitting the food particles to fall from said confinement portion in a mass having a configuration substantially corresponding to the cross section of said confinement portion transverse to said screen axis when moved to said release position, the food particles defining said mass separating and being substantially evenly distributed below said screen over the surface upon said mass engaging said screen and the food particles falling therethrough, said screen having a center region and a circular outer periphery concentric to said screen axis, a circular hole concentrically defined in said screen central region having a diameter less than the transverse dimension of said food particle mass, said screen being of a conical configuration converging in the direction of said food particle release means, said circular hole defining the apex of said screen.

3. Apparatus for evenly distributing predetermined portions of food particles as in claim 2, a food particle impervious baffle defined on said screen adjacent said opening, said baffle extending downwardly along said screen no greater than one-third the vertical length of said screen.

4. Apparatus for evenly distributing predetermined portions of food particles over a surface comprising, in combination, a frame adapted to be superimposed over the surface to receive the food particles, a screen mounted on said frame having an axis and a plurality of openings defined therein through which the food particles may fall, a hopper mounted on said frame in spaced relationship above said screen having a food particle confinement portion substantially aligned with said screen axis, and instantaneous food particle release means in alignment with said screen axis instantaneously movable between release and confine positions maintaining the food particles within said hopper confinement portion when in said confine position and permitting the food particles to fall from said confinement portion in a mass having a configuration substantially corresponding to the cross section of said confinement portion transverse to said screen axis when moved to said release position, the food particles defining said mass separating and being substantially evenly distributed below said screen over the surface upon said mass engaging said screen and the food particles falling therethrough, said food particle release means comprising a trap door, pivot means supporting said door for pivoting of said door between said release and confine positions, and door operating means operatively associated with said door.

5. Apparatus for evenly distributing predetermined portions of food particles as in claim 4, spring means operatively connected to said door biasing said door toward said confine position.

6. Apparatus for evenly distributing predetermined portions of food particles as in claim 4, said trap door comprising a pair of door panels each pivotally supported, a linkage interconnecting said door panels for simultaneous operation between said release and confine positions, said door operating means being attached to said linkage.

7. Apparatus for evenly distributing a predetermined portion of food particles over a surface comprising, in combination, a frame adapted to be located vertically above the surface to receive the food particles, food particle confinement means having a vertical axis defined on said frame, instantaneously operable food particle release means selectively releasing food particles from said confinement means in a mass having a configuration corresponding to that of said confinement means whereby the food particle mass falls from said confinement means along said vertical axis, and a food particle pervious screen mounted upon said frame below said confinement and release means receiving said falling food particles mass and substantially evenly distributing said food particles over the surface below said screen, said screen being of a substantially conical configuration having a substantially vertical axis coincident with said food particle confinement means axis, said screen converging in an upward direction toward said confinement means having an upper apex region, and food particle distribution means defined on said screen.

8. Apparatus for evenly distributing predetermined portions of food particles as in claim 7, said food particle distribution means including a hole defined in said screen upper apex region concentric to said screen axis and having a radial dimension less than the radial dimension of said food particle mass.

9. Apparatus for evenly distributing predetermined portions of food particles as in claim 8, said food particle distribution means including a truncated conical food particle impervious baffle defined on said screen adjacent said upper apex region having an upper end adjacent said hole and a lower end located a distance below said hole no greater than one-third the vertical length of said screen.

10. Apparatus for evenly distributing predetermined portions of food particles as in claim 9, said food particle distribution means including a plurality of axially spaced circular elements intersected by vertically extending elements located below said baffle defining a plurality of screen openings through which food particles may fall to the surface upon which food particles are to be distributed.

11. Apparatus for evenly distributing predetermined portions of food particles as in claim 10, said screen openings being of a substantially trapezoidal configuration.

* * * * *